PRINT CHARACTERISTICS DISPLAYER

Filed Aug. 16, 1963 2 Sheets-Sheet 1

INVENTOR.
ROY A. JENSEN
BY John L. Jackson
ATTORNEY

United States Patent Office 3,345,908
Patented Oct. 10, 1967

3,345,908
PRINT CHARACTERISTICS DISPLAYER

Roy A. Jensen, San Jose, Calif., assignor to International Business Machines Corporation, New York, N.Y., a corporation of New York Filed Aug. 16, 1963, Ser. No. 302,516
3 Claims. (Cl. 88—14)

This invention relates to image measurement processes in general and more particularly to a system for providing a graphical representation of the print characteristics of a document or other similar type subject.

As a result of the recent intensive activity in document storage, transmission and display, a growing need has arisen for a means of quantitatively evaluating document and microimage characteristics. While some work has been done in the area of "print quality" evaluation, little useful information is presently available and a good correlation between print characteristics and any of the technologies concerned, such as microfilm exposure and document readability, is completely lacking. The primary tool used for such evaluation today is human judgment, a highly subjective method in the case of documents and of little value in the evaluation of microimages.

In document storage systems, which depend upon the correct and efficient use of human skill in reading the output documents, precautions must be taken to insure that the documents introduced into storage will be readable upon retrieval. When these systems store images of documents, these precautions may take the form of insuring that the physical characteristics of the input documents can tolerate degradation introduced by the system or decreasing degradation introduced by the system, or some combination of these two. Thus, if the image storage system must handle documents ranging from printed, high contrast documents to smeared and smudgy carbon copies, some indication is needed as to whether or not images of questionable documents can be stored and retrieved. Without an objective indication, documents may be rejected, duplications of which would be readable at the output, or documents stored, duplications of which might not be readable in the output.

At present, document quality is determined by having a person make a subjective judgment of the document characteristics, and perhaps even adjust the processing procedure using this subjective judgment of document quality. Although these judgments may improve with practice and with the aid of guides, human judgments vary from observation to observation and from person to person. This variation can be attributed to the large number of variables which individually and collectively influence inter-document comparison. Examples of these variables include: object contrast, edge sharpness, contour gradiant or blur, line width or stroke width, object size or type size, viewing distance, viewing angle, viewing time, ambient illumination, black versus white background, context of material, style of type, format of material, spacing of type, past exposure to the material, alignment of type, manner of ink deposit, paper thickness, paper type, color differences, and depth of print impression on the paper.

This continuing use of subjective human judgment in systems which are designed to be flexible enough to handle a range of documents is due to the fact that an objective index of document characteristics is presently lacking. Since documents with gross differences can be easily identified, this lack of an objective index probably is most significant when an attempt is made to identify a cutoff point for document storage or when an attempt is made to manipulate the document storage processing procedure as a function of the document characteristics.

As the characteristics of the documents approach a cutoff value, it takes the human evaluator an increasing amount of time to inspect the documents and also a greater number of wrong judgments result. Compounding the problem is that often the operator has no way of telling whether he has made a mistake in judgment or whether the associated processing system has changed. These problems would be greatly simplified if an objective measurement technique could be used to designate the cutoff point in document handling and processing. Such an index should ideally apply to an entire page, should be based on the physical characteristics of the documents, and should be quickly derivable by a machine to facilitate automatic machine control.

In the preceding and following discussion, a distinction is made between print characteristics and print quality. Print characteristics are those characteristics which can be measured in physical terms while print quality is a subjective rating of the acceptability and legibility of the print which depends on human reactions to these characteristics.

In a co-pending patent application assigned to the assignee of the subject invention entitled "Quantitative Image Measurement Process," Serial No. 302,655, a quantitative image measurement process which is entirely objective and independent of subjective human judgment is presented. In accordance with this process, an image to be evaluated is scanned by means of, for instance, a photocell to produce a waveform indicative of the print content of the image. In one embodiment of this method, the time that the voltage from the photocell exceeds a number of voltage levels is summed for each of the voltage levels and the resultant summations average for each voltage level. These times are then plotted against their associated voltage levels, which are proportional to reflectance levels, to provide a composite trace from which objective measurements of print characteristics for the entire document can be taken even though it is made from a finite sample of crossings along the scan line.

It is an object of the subject application to provide a novel and simple way of implementing the above described image measurement process.

Another object of the present invention is to provide a system for providing a composite trace or average of a plurality of repetitious pulses.

Another object of the present invention is to provide a system for determining the time that a plurality of pulses exceed a number of given voltage levels.

Other and further objects and advantages of the invention will be apparent from the following more particular description of the preferred embodiment of the invention, as illustrated in the accompanying drawings in which.

Briefly, an optoelectronic means such as a photocell is used to repeatedly scan a path of print on a document, the print characteristics of which are to be evaluated. The pulses generated by the repeat scans are successively added to a slowly rising ramp to provide a combined signal which is supplied to a bistable gating means. Due to the rising ramp, a lower (and wider) portion of the print pulses turn on the bistable gating means each scan. Consequently, the gating means will be on slightly longer for each successive scan. The resultant output from the bistable gating means for a given number of pulses is integrated each scan. The magnitude of this integral will increase at the same rate as the average pulse width. The value representing the magnitude of the integral is transferred to a storage capacitor. The integrator is reset for each scan. The voltage on the storage capacitor is then plotted as a function of time.

It should be understood that the image to be scanned may be a transmission or reflectance modulator of the incident light (transparency or opaque) and the line intelligence may be of either the maximum or minimum intensity (negative or positive). If scanning a transparency, the ratio of intensity in a given area with respect to the incident intensity is called transmittance, whereas with an opaque image, the ratio of diffuse reflected intensity from a given area with respect to the incident intensity (or to the intensity from a "perfect diffuse") is called reflectance. Although the process to be described is unrestricted as to the nature of the image to be measured, this characteristic will be called reflectance hereafter and the term transmittance can be substituted.

In the heretofore mentioned quantitative measurement process, it was stated that a microdensitometer output is a voltage proportional to the amount of energy received by a photocell through an aperture. In effect then, the microdensitometer waveform contains the total time that the output of a photocell exceeds a given voltage level. Thus, given a large number of samples at different voltage levels, a waveform similar to that which could be obtained by use of microdensitometer techniques can be generated simply by plotting the time that the output of the photocell exceeds the various sample voltages.

Going further, while the averaging of complete microdensitometer waveforms would be quite difficult, it would be much easier to sum the time that the output voltage of a photocell exceeded a given level as it scanned across a page, and that by taking the time sums at various reflectance or voltage levels, a composite waveform would result containing at least as much information as would have been available if each character had been carefully microdensitometered and the resultant individual waveforms somehow averaged.

Figure 1:
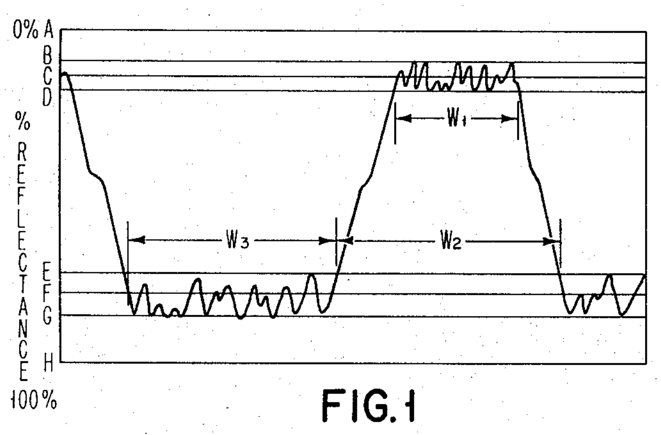
FIG. 1 is a typical trace generated by scanning a document having printing thereon with an optoelectronic arrangement such as a photocell.
Figure 2:
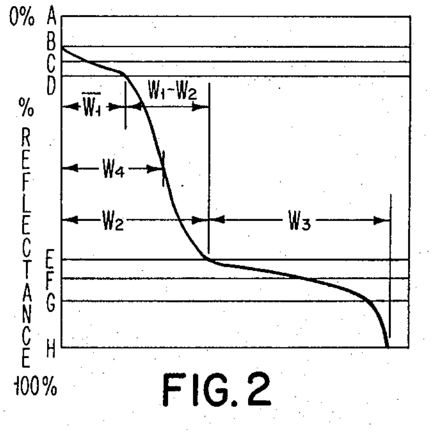
FIG. 2 is a representative trace produced by the subject system.

Refer first to FIG. 1 which is a detailed waveform representative of the output of a photocell as it scans across a print bar. Various levels A through H are identified in FIG. 1 as well as in FIG. 2. These levels in both FIGS. 1 and 2 are identical and the explanation relating to them is common to both figures. Level A represents 0% reflectance while level B represents minimum print reflectance (darkest print). Level D represents maximum print reflectance while level C, which is the mean between levels B and D, represents average print reflectance. Level E represents the minimum background or paper reflectance while level G represents maximum background reflectance and level F then is average background or paper reflectance. Clearly, then, level D minus level B represents print irregularity while level G minus level E represents background or paper irregularity. Likewise, in FIGS. 1 and 2 are shown various widths W1 through W3. The widths of FIG. 1 apply to the single pulse shown whereas the widths of FIG. 2 represent average width or summations of a number of widths of waveforms similar to that of FIG. 1 generated from a number of samples. In FIG. 1, (W2—W1)/2 represents edge distance while W3 represents space width. In FIG. 2, as previously discussed in connection with FIG. 1, (W2–W1)/2 represents edge distance or sharpness, W3 represents space width, and W4 represents print width. Again, as previously stated, the plot of FIG. 2 is a plot representing the average print characteristics of a document and, thus, the widths shown thereon are average widths and the levels are average levels. Thus, from the plot of FIG. 2, meaningful information relating to (1) average background reflectance, (2) average print reflectance, (3) average edge transition distance, (4) average print bar width, (5) average space between print bar crossings, (6) variation in print reflectance, and (7) variation in background reflectance can be obtained for the entire document. This process is more fully explained in the above referenced co-pending application.

By "random scanning," as used herein is meant that the document can be scanned along any path as long as the path crosses the print of the document. As described in the aforereferenced application Serial No. 302,655, the randomly selected path to be scanned is repetitively scanned during an evaluation operation.

Figure 4:
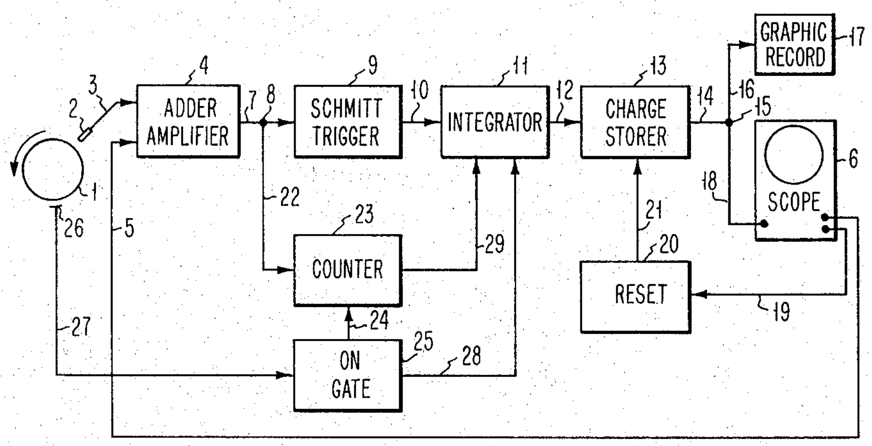
FIG. 4 is a block diagram of the subject system.

Refer next to FIG. 4 wherein is shown a block diagram of the subject novel system which may be utilized to provide a plot of the average print characteristics of a document in accordance with the above briefly described process. The system of FIG. 4 provides an effective average of the total microdensitometer type waveforms of the print content of a document in accordance with the above discussion wherein the method presented was to sum the time that the output voltage of a photocell exceeded given levels as it scanned across a page and to take a number of runs at various levels to provide a composite waveform containing the exact information which would have been available if each character had been carefully microdensitometered and the resultant waveforms averaged. Thus, in FIG. 4 is illustrated a workable system for implementing the above described scheme.

In FIG. 4 is shown a drum 1 upon which may be mounted a document, the print characteristics of which are to be evaluated. The drum 1 may be supported and rotated by any suitable means (not shown). In scanning association with a document when it is mounted on the drum 1 is a photocell 2 which is connected along line 3 to an adder-amplifier 4. The adder-amplifier 4 also receives an input along line 5 from an oscilloscope 6 or other similar type of ramp generator. The output of the adder-amplifier is fed along line 7 through junction 8 to a Schmitt trigger 9. The output of the Schmitt trigger is fed along line 10 to an integrator 11. The output of the integrator 11 is fed along line 12 to a charge storer 13 which in turn is connected along line 14 to junction 15. Junction 15 is connected along line 16 to a graphic recorder 17 and along line 18 to the oscilloscope 6. The oscilloscope 6, in addition to being connected to the adder-amplifier 4 along line 5, is connected along line 19 to a reset means 20. The reset means 20 is connected along line 21 to the charge storer 13.

Junction 8, at the input to the Schmitt trigger 9, is connected along line 22 to a counter 23. The counter 23 is also connected along line 24 to an ON gate 25. A small sensing photocell 26 is in scanning association with the document mounted on drum 1 and has its output fed along line 27 to the ON gate 25. The output of the ON gate 25 is fed along line 28 to the integrator 11. The output of the counter 23 is connected to and makes up the third input along line 29 to the integrator 11.

Figure 3:
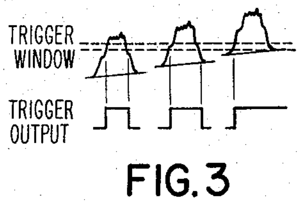
FIG. 3 is a graphical representation illustrative of the method used herein of effectively sampling at various voltage levels.

In operation, a document that is to be evaluated is mounted on the drum 1 in optical association with the photocells 2 and 26. The drum is rotated and the output of the photocell 2, which is an analog signal representative of the print content of the document, is fed along line 3 to the adder-amplifier 4. In the adder-amplifier 4 this signal is added to a relatively slow rising ramp signal supplied along line 5 from the oscilloscope 6. It has been found that fifty scans per ramp will yield fairly good resolution in the final trace. The number of scans may, however, be varied depending upon the resolution required. The output of the adder-amplifier 4, which is the amplified analog signal from the photocell 2 added to the ramp signal, is fed into the Schmitt trigger 9 along line 7. As illustrated for a single repetitious pulse in FIG. 3, the input level or window of the Schmitt trigger 9 is set such that because of the ramp, a lower portion of the print pulses operate the trigger for each successive scan. Since the pulses widen for higher reflectance levels, the trigger is on slightly longer for each pulse on each successive scan. The output of the trigger, which is a train of pulses of constant amplitude the width of which depends on the width of the incoming pulses, is fed along line 10 to the integrator 11. A set number of the pulses is integrated in the integrator 11 for each scan. The number is controlled by the counter 23 which acts along line 29 to reset the integrator 11 when the preset number of pulses has been received.

The counter 23 acts to not only reset the integrator 11, but also holds it off until the ON gate 25 takes over the function of holding the integrator off so it will not have an output on it after the preselected number of pulses has been counted. The amplitude of any particular integral is proportional to the width of the incoming pulses at the reflectance level that was operating the trigger for that scan. Since the pulses from the Schmitt trigger become wider for each successive scan, each integral is larger than the preceding integral. Each successive integral represents the width at a higher reflectance level. Finally, the ramp lifts the highest reflectance level on the document above the Schmitt trigger "on level" and the output is one continuous pulse, but, the integration of this pulse is still terminated at the end of the same number of incoming pulses counted by the counter 23, which provides the sharp fall on the right hand portion of the curve of FIG. 2. Thus, the final few integrals are proportional to the same scan length that contain the preset number of print crossings. Therefore, the difference between the final integrals and those in the middle of the train is proportional to the space between print crossings. The envelope of the train of integrals fed along line 12 to the charge storer 13 provides the final trace as represented in FIG. 2. The amplitude of each integral is transferred along line 12 to the charge storer 13, which may be a capacitor or similar type store. The voltage on the charge storer 13, when viewed on an oscilloscope or recorded on the graphic recorder 17, provides the trace of FIG. 2.

At the end of each ramp, the oscilloscope 6 furnishes an indication of the end of the ramp along line 19 to the reset means 20, which, along line 21, removes the charge from the charge storer 13 thereby effectively resetting it.

Integration of the same pulses in the integrator 11 during each scan is controlled by the ON gate 25 and counter 23. The ON gate 25 is triggered by the photocell 26 at the beginning of each scan along line 27. The ON gate starts the integrator 11 along line 28 and the counter 23 along line 24. The counter is AC coupled to the adder-amplifier 4 along 22 and is not affected by the ramp. When the set number of print crossings has been made, the counter 23, as previously stated, resets itself and the integrator 11. Some time later the ON gate 25 turns off and takes over the function of holding the integrator off.

Figure 5:
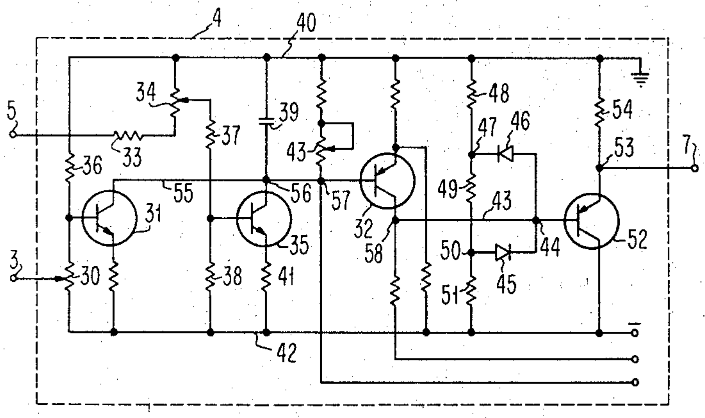
FIG. 5 is a schematic of the adder-amplifier of the system.

Refer next to FIG. 5 wherein is shown a schematic of the adder-amplifier 4. As previously stated, the input to the adder-amplifier 4 is from both a photocell 2 along line 3 and the ramp generator along line 5. Line 3 is connected through a variable resistor 30 to the base of the NPN transistor 31, the collector of which is connected along line 55 through junctions 56 and 57 to the base of the PNP transistor 32. Line 5 is connected through a dropping resistor 33, potentiometer 34 and resistor 37 to the base of NPN transistor 35. Resistors 36 and 30, and 37 and 38 are the bias resistors for NPN transistors 31 and 35, respectively.

The collector of NPN transistor 35 is connected through capacitor 39 to a grounded common line 40 and the emitter of NPN transistor 35 is connected through resistor 41 to a common line 42. Line 42 is connected to a negative source. The collector of the PNP transistor 32 is connected along line 43 to junction 44 which in turn is connected to the cathode of diode 45 and anode of diode 46. The cathode of diode 46 is connected to junction 47 which in turn is connected through resistor 48 to line 40. Junction 47 is also connected through resistor 49 to junction 50, which in turn is connected through resistor 51 to line 42. Junction 44 is connected to the base of PNP transistor 52, to line 42. Junction 44 is connected to the base of PNP transistor 52, the collector of which is connected to line 42 and the emitter of which is connected to junction 53, which is in turn connected to the output line 7. Junction 53 is also connected through resistor 54 to common line 40.

In the operation of the circuit of FIG. 5, pulses from the scanning photocell 2 are fed along line 3 through the potentiometer 30 to the base of transistor 31. Potentiometer 30 can be adjusted to set the amplitude of the incoming print pulses. The ramp from the ramp generator, which in this instance is an oscilloscope, is applied along line 5 through resistor 33, potentiometer 34 and resistor 37 to the base of transistor 35. Variable resistor 34 can be adjusted to set the amplitude of the incoming ramp signal. This adjustment was necessary since the ramp furnished by an oscilloscope is of rather high amplitude. Transistors 31 and 35 and their associated circuitry act as a conventional adder. The adder signal developes at junction 56 and is fed through junction 57 to the base of transistor 32, which acts as a stage of gain in a conventional manner. The amplified signal from transistor 32 appears at junction 58 and is fed along line 43 to junction 44. The complete signal must be allowed to develope at junction 57. The two diodes 45 and 46 are used to provide a window which is slightly wider than the associated Schmitt trigger window as will hereinafter be explained. The reason for the two diodes is that in one case the power dissipation of the transistor 32 must be held down and in the other case to keep the signal at the collector of transistor 32 from bottoming and thereby causing distortion of the input signal. The signal appearing at junction 44 is applied to an emitter follower which is used for isolation purposes. The emitter follower is necessary since the input impedance of the trigger connected to line 7 changes as it fires such that if it were connected directly to the amplifier, the gain of the amplifier would be changed.

Figure 6:
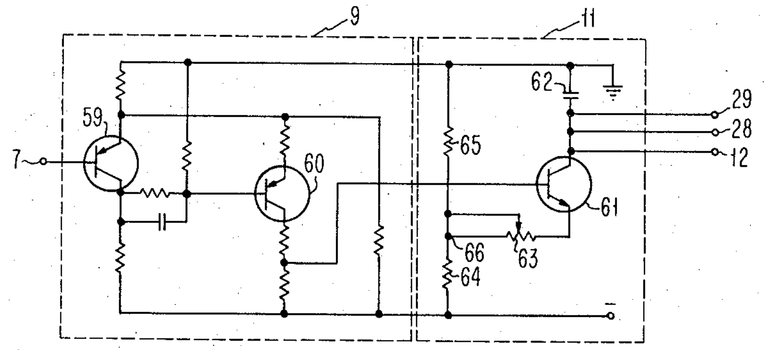
FIG. 6 is a schematic of the Schmitt trigger and integrator of the system.

Refer next to FIG. 6 which is a schematic diagram of the Schmitt trigger 9 and integrator 11 of the block diagram of FIG. 4. In FIG. 6 is shown line 7 from the adder-amplifier 4 connected to the base of a PNP transistor 59 which, along with transistor 60, acts as a Schmitt trigger. The trigger is a straightforward trigger and has its output taken from the collector of transistor 60 along line 10 to the base of transistor 61. A capacitor 62 is connected to the collector of transistor 61 and lines 12, 28 and 29, which are connected to the charge storer 13, the ON gate 25 and counter 23 respectively, are also connected to the collector of transistor 61. The emitter of transistor 61 is connected through a variable resistor 63 to a junction 66, which in turn is connected through a resistor 64 to a negative supply and through resistor 65 to ground.

Resistors 64 and 65 are voltage dividers which hold the emitter of transistor 61 slightly more positive than the negative potential. Thus, when transistor 60 is off, transistor 61 is reversed bias since its base is held at essentially the potential of the negative supply while its emitter is held slightly positive with respect thereto. The potentiometer 63 adjusts the size of the integral. That is, when the trigger goes "on" (when transistor 60 conducts), a pulse is fed into transistor 61 of a certain amplitude which is fixed by the trigger 9. The width of the pulse will, however, depend on the width of the incoming pulse to the trigger. The emitter resistance of transistor 61 is fixed (once the potentiometer 63 is set) and allows a fixed current to flow which flows down through transistor 61 from capacitor 62 and causes the voltage waveform on capacitor 62 to be a negative going ramp. When the pulse due to a print crossing ceases and the trigger goes off, the voltage on the capacitor 62 remains constant until there is another ramp and this repeats for each pulse which is integrated until finally there is a net voltage across capacitor 62, which is the measured signal. The slope of each of the ramps is fixed. It is proportional to the amplitude of the pulses from the trigger, but the time that the ramp is on is proportional to the width of the pulses from the trigger, therefore at the end, the voltage on the capacitor is proportional to the width of the incoming pulses.

As will hereinafter be discussed, line 29 is grounded by the counter 23 to reset the integrator and the ON gate 25 also grounds capacitor 62 along line 28. The output of the integrator 11 is fed along line 12 to the charge storer 13.

Figure 7:
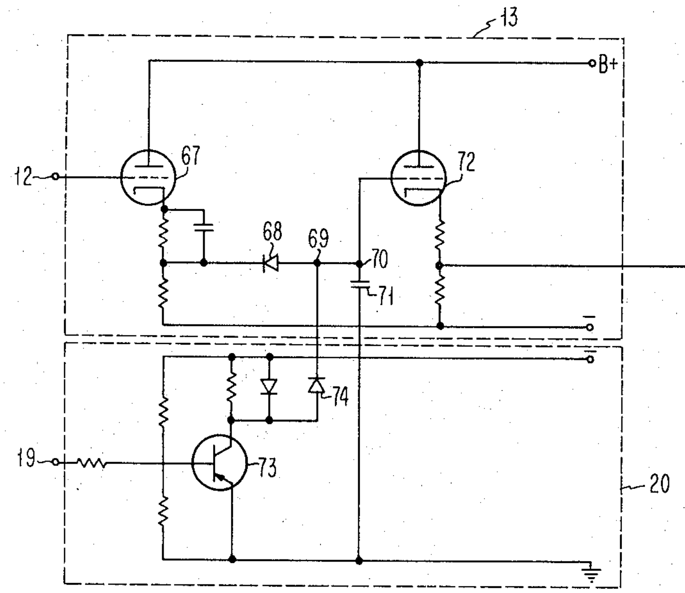
FIG. 7 is a schematic of the charge storer and reset of the system.

Refer next to FIG. 7 wherein is shown a schematic of the charge storer 13 and reset means 20. The input from the integrator 11 is fed along line 12 to the grid of a triode 67 which is connected in conventional cathode follower fashion to the cathode of a diode 68 which has its anode connected to junction 69. Junction 69 is also connected to junction 70 which is connected to one side of capacitor 71 and to the grid of a second triode 72. Triode 72 again is connected in cathode follower fashion and has its output taken along line 14.

Line 19, which is the input from the scope 6 to the reset means 20, is connected to the base of a PNP transistor 73, the collector of which is connected to the anode of diode 74 the cathode of which is connected to junction 69. Conventional potentials are also provided for biasing and supplying the transistor and triodes.

Triode 67, which is connected in cathode follower configuration, is diode coupled through diode 68 to capacitor 71. The phase of the cathode follower is, of course, in phase with the negative going signal appearing on line 12 from the integrator 11. Thus, the waveform on the capacitor 62 in the integrator causes the cathode follower to go negative to draw charge off of capacitor 71 through diode 68 until it reaches a certain negative value. When the integrator is reset and the cathode of triode 67 starts positive, diode 68 prevents the charge on capacitor 71 from being affected. The charge, therefore, remains on capacitor 71. During the next integral, the grid of triode 67 will go either as negative or more negative than during the preceding integral due to the increasing width of the print pulses and will either keep the charge on capacitor 71 the same as before or slightly decrease it. The voltage across capacitor 71 is essentially the output. Again, though, to avoid extra current or dissipation of charge from capacitor 71, it is coupled through a triode 72 connected in cathode follower configuration to the actual output line 14.

The only function of transistor 73 is to apply essentially ground potential through diode 74 when a positive pulse is applied to line 19 from the scope 6 at the end of a trace. Thus, when transistor 73 is turned on the collector goes essentially to ground which through diode 74 discharges capacitor 71.

Figure 8:
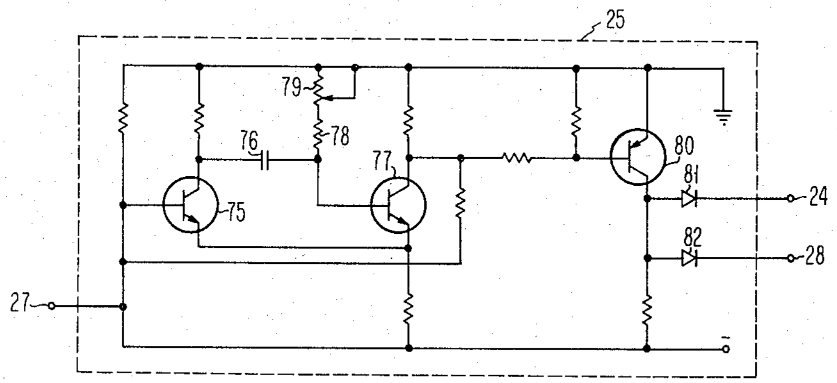
FIG. 8 is a schematic of the ON gate of the system.

Refer next to FIG. 8 which is a schematic of the ON gate 25. The ON gate 25, as shown in FIG. 8, is more complicated than is necessary. It was originally intended that the ON gate 25 wound function not only to turn on the integrator 11, but would also act to turn off the integrator after a certain duration of time. Thus, the counter 23 shown in FIG. 4 was not originally included in the system. It has been found, however, that more accurate results occur through use of a conventional counter 23 rather than using a timing device such as is shown in FIG. 8 to turn the integrator off after a predetermined time. Thus, in FIG. 8 is shown an input along line 27 from the scanning photocell 26, which is applied to the base of transistor 75. The collector of transistor 75 is connected through capacitor 76 to the base of transistor 77. It is obvious that transistors 75 and 76' act as a one-shot. The time that the one-shot will be on is controlled by the time constant of capacitor 76, resistor 78 and potentiometer 79. Thus, adjustment of potentiometer 79 varies the time that the one-shot will be on. As previously stated, this one-shot is no longer necessary since a counter has now been included. When the signal on the collector of transistor 77 goes negative, a negative potential is applied to the base of transistor 80 thereby turning it on which causes its collector to go essentially to ground. Lines 24 and 28 through diodes 81 and 82 are thus grounded. Line 24 is, of course, connected to the counter 23 and line 28 is connected to the integrator 11. As previously discussed, applying a ground potential to line 28 will reset the integrator.

No discussion of the counter 23 will be herein presented since many straightforward type counters are available. The only control function which must be provided to the counter is that it must be capable of being reset by application of a ground potential along line 24. Additionally, it must be capable of amplitude selection such that noise or background pulses are not counted.

In summary, an optoelectronic means 3 such as a photocell is used to repeatedly scan a path of print on a document, the print characteristics of which are to be evaluated. The pulses generated by the repeat scans are successively added to a slowly rising ramp provided by an oscilloscope 6 to provide a combined signal which is supplied to a bistable gating means such as a Schmitt trigger 9. Due to the rising ramp, a lower (and wider) portion of the print pulses turn on the bistable gating means 7 each scan. Consequently, the gating means 7 will be on slightly longer for each successive scan. The resultant output from the bistable gating means for a given number of pulses is integrated in an integrator 11 each scan. The magnitude of this integral will increase at the same rate as the average pulse width. The value representing the magnitude of the integral is transferred to a charge storer 13. The integrator 11 is reset for each scan by a counter 23. The counter 23 is initially turned on by an ON gate 25. The voltage on the charge storer 13 is plotted as a function of time in a graphic recorder 17 or may be viewed on a scope 6.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. An apparatus for producing a curve containing information relating to the print characteristics of an image including:

scanning means in operable association with said image for producing an output signal modulated by the print content of said image, means for generating a ramp signal whose slope is such that during each scan the amplitude of said signal can be considered a constant, adding means receiving said ramp signal and said output signal from said scanning means and producing a third signal which is the sum of said output signal from said scanning means and said ramp signal, bistable gating means receiving said third signal and producing an output when said third signal from said adding means exceeds a predetermined amplitude, integrating means, coupled to said bistable gating means, producing a signal proportional to the time which said bistable gating means produces a signal, storing means, coupled to said integrating means, recording the maximum signal produced by said integrating means, reset means, coupled to said means for generating a ramp signal, resetting said storing means to its initial value when said ramp signal has reached its maximum amplitude, counting means, coupled to said scanning means and said integrating means, recording the number of maximum to minimum deflections in the signal produced by said scanning means, said counting means shutting off said integrating means when a predetermined number of such deflections have occurred, starting means, coupled to said scanning means, said counting means, and said integrating means, turning on both said counting means and said integrating means when said scanning means again reach the beginning of said image, and display means, coupled to said storing means, displaying the amplitude of each signal stored in said storing means against the amplitude of said ramp signal producing a record representative of the print characteristics of the image.

2. An apparatus for generating a curve as specified in claim 1 wherein the scanning means are optoelectronic.

3. An apparatus for producing a curve containing information relating to the print characteristics of an image comprising:

optoelectronic means for scanning said image, said optoelectronic means providing an output during each crossing of a segment of said image, means for generating a ramp voltage, adding means, receiving said ramp voltage and said output from said optoelectronic means, producing a third signal which is the sum of said output from said optoelectronic means and said ramp voltage, bistable gating means receiving said third signal and producing an output when said third signal from said adding means exceeds a predetermined level, integrating means, coupled to said bistable gating means, producing a signal proportional to the time which said bistable gating means produces a signal, counting means, connected to both said integrating means and said adding means, controlling the number of pulses said integrating means integrates, storing means, coupled to said integrating means, recording the signal produced by said integrating means, display means, coupled to said storing means, displaying said stored signal against the amplitude of said ramp voltage producing a record representative of the print characteristics of the image.

References Cited

UNITED STATES PATENTS

| | | | |
|---|---|---|---|
| 2,738,499 | 3/1956 | Sprick ------------ | 340—146.3 |
| 3,213,422 | 10/1965 | Fritze et al. -------- | 340—146.3 |

JEWELL H. PEDERSEN, *Primary Examiner.*

F. SHOON, O. B. CHEW, *Assistant Examiners.*